US012623623B2

(12) United States Patent
Yajima et al.

(10) Patent No.: US 12,623,623 B2
(45) Date of Patent: May 12, 2026

(54) PASSENGER PROTECTION DEVICE

(71) Applicant: TOYODA GOSEI CO., LTD., Kiyosu (JP)

(72) Inventors: Takatoshi Yajima, Aichi (JP); Shinji Yamada, Aichi (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/237,149

(22) Filed: Jun. 13, 2025

(65) Prior Publication Data

US 2025/0381929 A1     Dec. 18, 2025

(30) Foreign Application Priority Data

Jun. 18, 2024     (JP) ................................. 2024-098309

(51) Int. Cl.
    *B60R 21/18*         (2006.01)
    *B60R 21/217*       (2011.01)

(52) U.S. Cl.
    CPC ............ *B60R 21/18* (2013.01); *B60R 21/217* (2013.01)

(58) Field of Classification Search
    CPC ....... B60R 21/237; B60R 21/00; B60R 21/20; B60R 21/18; B60R 21/231; B60R 21/215; B60R 21/217; B60R 2021/0044; B60R 2021/21531; B60R 2021/0048; B60R 2021/23115; B60R 2022/006
    See application file for complete search history.

(56) References Cited

U.S. PATENT DOCUMENTS

| | | | | |
|---|---|---|---|---|
| 5,871,230 A | * | 2/1999 | Lewis ..................... | B60R 22/14 |
| | | | | 280/743.1 |
| 6,863,298 B2 | * | 3/2005 | Sakai .................. | B60R 22/1952 |
| | | | | 280/728.1 |
| 7,377,544 B2 | * | 5/2008 | Itoga ................... | B60R 22/1951 |
| | | | | 280/730.1 |
| 7,798,522 B2 | * | 9/2010 | Itoga ..................... | B60N 2/688 |
| | | | | 280/730.1 |
| 9,616,747 B1 | * | 4/2017 | Breed ................. | B60W 30/146 |
| 11,414,036 B2 | * | 8/2022 | Markusic ................ | B60R 22/14 |
| 11,603,063 B2 | * | 3/2023 | Hayashi .................. | B60R 21/18 |
| 2005/0184491 A1 | * | 8/2005 | Itoga .................. | B60N 2/42718 |
| | | | | 280/736 |
| 2006/0012159 A1 | * | 1/2006 | Kore ...................... | B60R 21/18 |
| | | | | 280/733 |

(Continued)

FOREIGN PATENT DOCUMENTS

JP          2007-137240 A      6/2007

*Primary Examiner* — Toan C To
(74) *Attorney, Agent, or Firm* — Posz Law Group, PLC

(57)          ABSTRACT

A passenger protection device has a seat, a seat belt for restraining a passenger seated on the seat, an airbag disposed on the seat belt in a lap belt which restrains a waist of the passenger seated on the seat while the seat belt is worn, and an inflator disposed close to a lower end of the seat and supplying inflation gas to the airbag. The airbag includes a bag body formed of a flexible sheet body and inflated to protect the passenger, and a conduit part connected to the inflator and allowing the inflation gas to flow into the bag body. The conduit part is disposed between a seat part of the seat and a side cover covering a lateral side of the seat part, in a state of being held by a holder attached to a seat frame side of the seat.

2 Claims, 13 Drawing Sheets

SCHEMATIC SECTIONAL VIEW OF A-A PART

(56) References Cited

U.S. PATENT DOCUMENTS

| | | | | |
|---|---|---|---|---|
| 2006/0028004 | A1* | 2/2006 | Oota | B60R 21/206 |
| | | | | 280/733 |
| 2006/0119085 | A1* | 6/2006 | Masuda | B60R 21/18 |
| | | | | 280/733 |
| 2015/0069741 | A1* | 3/2015 | Shimazu | B60R 21/233 |
| | | | | 280/729 |
| 2015/0091283 | A1* | 4/2015 | Yamanaka | B60R 21/18 |
| | | | | 280/733 |
| 2016/0297396 | A1* | 10/2016 | Moeller | B64D 25/00 |
| 2017/0057385 | A1* | 3/2017 | Kanto | B60R 21/235 |
| 2017/0225788 | A1* | 8/2017 | Humbert | B60R 21/233 |
| 2020/0122668 | A1* | 4/2020 | Ozaki | B60R 21/237 |
| 2020/0290545 | A1* | 9/2020 | Walker | B60R 21/18 |
| 2020/0298984 | A1* | 9/2020 | Walker | B60R 21/207 |
| 2021/0129785 | A1* | 5/2021 | Fischer | B60R 21/2338 |
| 2021/0300277 | A1* | 9/2021 | Fukaura | B60R 21/18 |
| 2022/0161751 | A1* | 5/2022 | Akoma | B60R 21/233 |
| 2022/0355755 | A1* | 11/2022 | Fischer | B60R 21/2338 |
| 2023/0103417 | A1* | 4/2023 | Matsuzaki | B60R 21/237 |
| 2023/0123318 | A1* | 4/2023 | Matsuzaki | B60R 21/233 |
| | | | | 280/733 |
| 2024/0067118 | A1* | 2/2024 | Matsuzaki | B60R 21/18 |
| 2024/0351545 | A1* | 10/2024 | Carlstedt | B60R 21/18 |
| 2024/0425010 | A1* | 12/2024 | Yajima | B60R 21/18 |
| 2025/0033589 | A1* | 1/2025 | Yajima | B60R 21/18 |
| 2025/0178555 | A1* | 6/2025 | Matsuzaki | B60R 21/18 |

* cited by examiner

SCHEMATIC SECTIONAL VIEW OF A-A PART

REAR

RIGHT ←→ LEFT

FRONT

LEFT ←→ RIGHT

UPPER

RIGHT ← → LEFT

LOWER

PASSENGER PROTECTION DEVICE

CROSS-REFERENCE TO RELATED APPLICATIONS

This application is based on and claims priority under 35 USC 119 from Japanese Patent Application No. 2024-098309 filed on Jun. 18, 2024, the entire content of which is incorporated herein by reference.

TECHNICAL FIELD

The present disclosure relates to a passenger protection device configured to protect a passenger.

BACKGROUND ART

In the related art, a passenger protection device has a configuration in which an airbag is disposed in a region of a lap belt of a seat belt, and a passenger seated on a seat in a state where the seat belt is worn is protected by the inflated airbag (bag body) at the time of operation (for example, see JP2020-066425A). In the passenger protection device in the related art, an inflator for supplying inflation gas to the airbag is disposed on a lower end side of a seat part of the seat, and the airbag has a bag-shape formed of a flexible sheet body, and includes the bag body that inflates to protect the passenger, and a conduit part that is connected to the inflator and allows inflation gas to flow into the bag body.

In the passenger protection device in the related art, the conduit part of the airbag passes through a lateral side of the seat part of the seat, but for example, when the airbag is mounted on a seat of a type in which the lateral side of the seat part is covered with a side cover, the conduit part may pass between the seat part and the side cover. In the seat having such a configuration, the side cover is attached to a seat frame after the airbag is held by the lap belt, but since the conduit part has an elongated shape formed of a flexible sheet body which is the same material as the bag body, it is difficult to dispose the conduit part at a predetermined position, and attachment workability at the time of attaching the side cover to the seat frame is not good.

SUMMARY OF INVENTION

An object of the present disclosure is to provide a passenger protection device capable of easily mounting an airbag on a seat of a type including a side cover.

An aspect of the present disclosure provides a passenger protection device configured to protect a passenger, the passenger protection device having:

a seat including a backrest part, a seat part, and a side cover covering a lateral side of the seat part;

a seat belt configured to restrain the passenger seated on the seat;

an airbag disposed on the seat belt in a region of a lap belt configured to restrain a waist of the passenger seated on the seat in a state where the seat belt is worn; and an inflator disposed in a vicinity of a lower end of the seat part, and configured to supply inflation gas to the airbag, in which the airbag is configured to include:

a bag body being in a bag-shape formed of a flexible sheet body, and inflated to protect the passenger in the state where the seat belt is worn; and a conduit part connected to the inflator, and configured to allow the inflation gas to flow into the bag body, and the conduit part is disposed between the seat part and the side cover in a state of being held by a holder attached to a seat frame side of the seat.

In the passenger protection device according to the present disclosure, the seat includes the side cover that covers the lateral side of the seat part, and the bag body of the airbag is coupled to the inflator disposed in the vicinity of the lower end of the seat part via the conduit part. The conduit part is disposed between the seat part and the side cover in a state of being held by the holder attached to the seat frame side. That is, in the passenger protection device according to the present disclosure, a position of the conduit part with respect to the seat (seat part or the like) can be restricted by attaching the holder holding the conduit part to the seat frame side, even when the elongated conduit part formed of a flexible sheet body which is the same material as the bag body passes between the seat part and the side cover. Therefore, when the seat frame is attached to the side cover in a state where the airbag is held by the lap belt, the conduit part can be disposed at an appropriate position, and it is possible to suppress engagement between the side cover and the seat frame.

Therefore, in the passenger protection device according to the present disclosure, the airbag can be easily mounted on the seat of the type including the side cover.

In addition, in the passenger protection device according to the present disclosure, when the holder is capable of holding the lap belt together with the conduit part, it is also possible to restrict the position of the lap belt with respect to the seat (seat part or the like), and attachment of the side cover to the seat frame is further facilitated, which is preferable.

Further, in the passenger protection device having the above-described configuration, when the holder includes the conduit part insertion portion in which the conduit part is inserted to be held and the lap belt insertion portion in which the lap belt is inserted to be held, which are arranged in a front-rear direction, it is possible to prevent the holder from being bulky even when the conduit part and the lap belt are held, which is preferable.

Furthermore, in the passenger protection device having the above-described configuration, when a lid part that covers a side facing the side cover is disposed on the holder, the side cover side of the conduit part can be covered with the lid part, protrusion of the conduit part from the holder can be appropriately suppressed, and attachment workability at the time of attaching the side cover to the seat frame is further improved, which is preferable.

BRIEF DESCRIPTION OF DRAWINGS

Exemplary embodiment(s) of the present invention will be described in detail based on the following figures, wherein.

DESCRIPTION OF EMBODIMENTS

Figure 1:
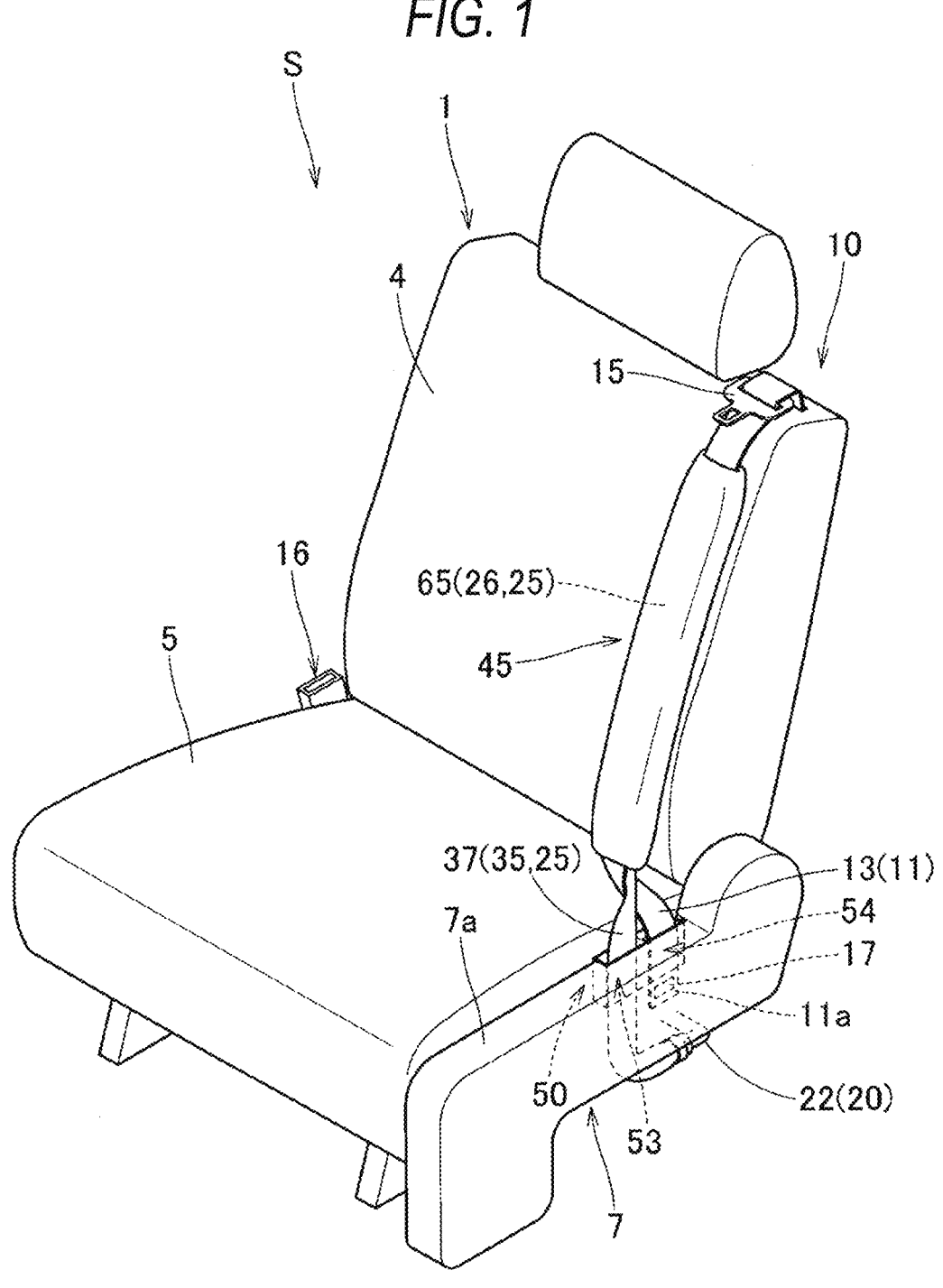
FIG. 1 is a perspective view illustrating a passenger protection device according to an embodiment of the present disclosure.
Figure 2:
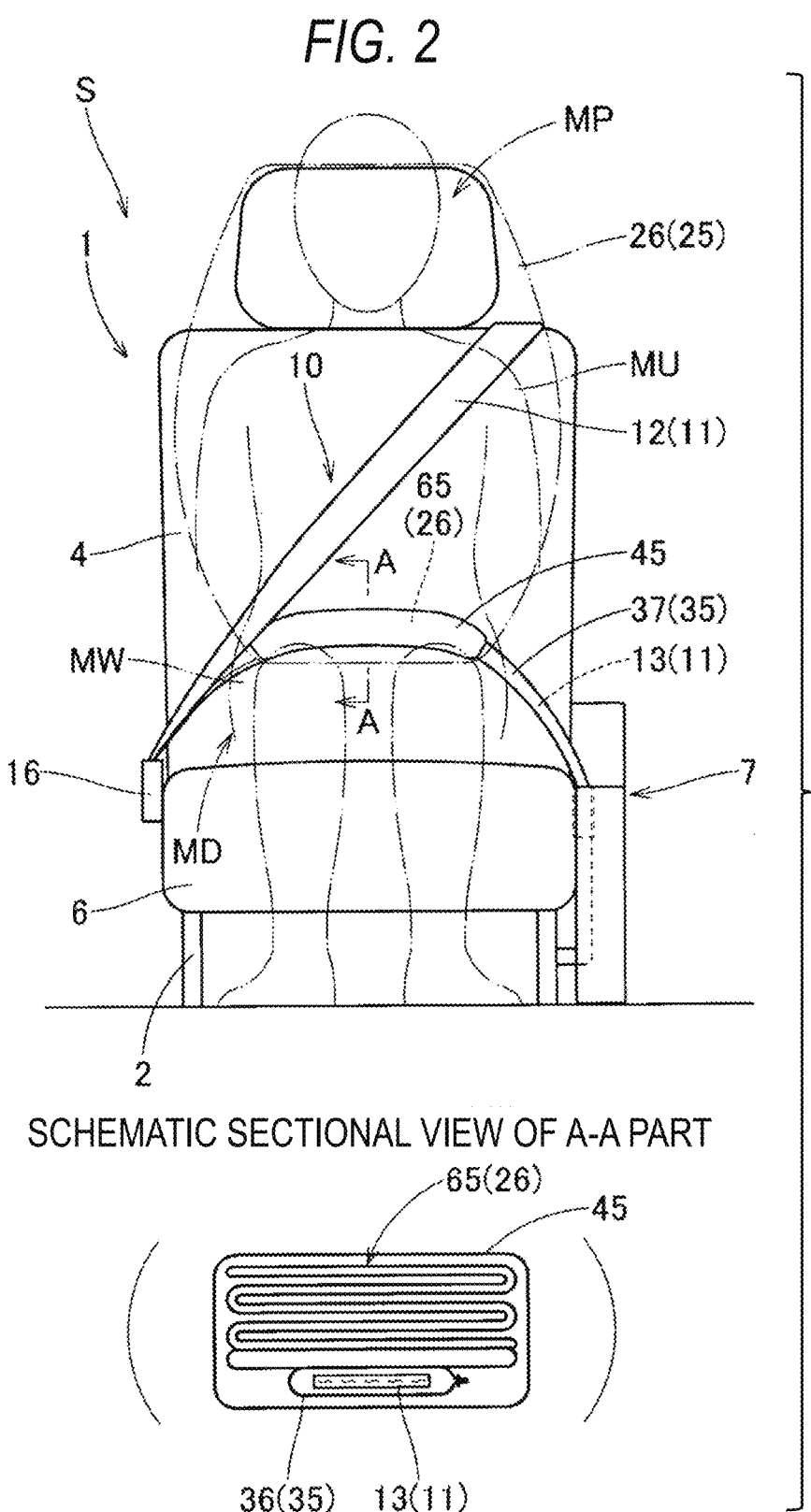
FIG. 2 is a front view of the passenger protection device according to the embodiment, illustrating a state where a seat belt is worn.

Hereinafter, an embodiment of the present disclosure will be described with reference to the drawings. A passenger protection device S according to the embodiment is mounted on a vehicle (not illustrated) and includes a seat 1, a seat belt 10, an airbag 25, an inflator 20 that supplies inflation gas to the airbag 25, and a holder 50 that holds a conduit part 35 described later in the airbag 25 and a lap belt 13 (belt body 11) described later of the seat belt 10, as illustrated in FIGS. 1 and 2. In the embodiment, front-rear, upper-lower, and left-right directions correspond to front-rear, upper-lower, and left-right orientations of a passenger MP seated on the seat 1 unless otherwise specified.

Figure 5:
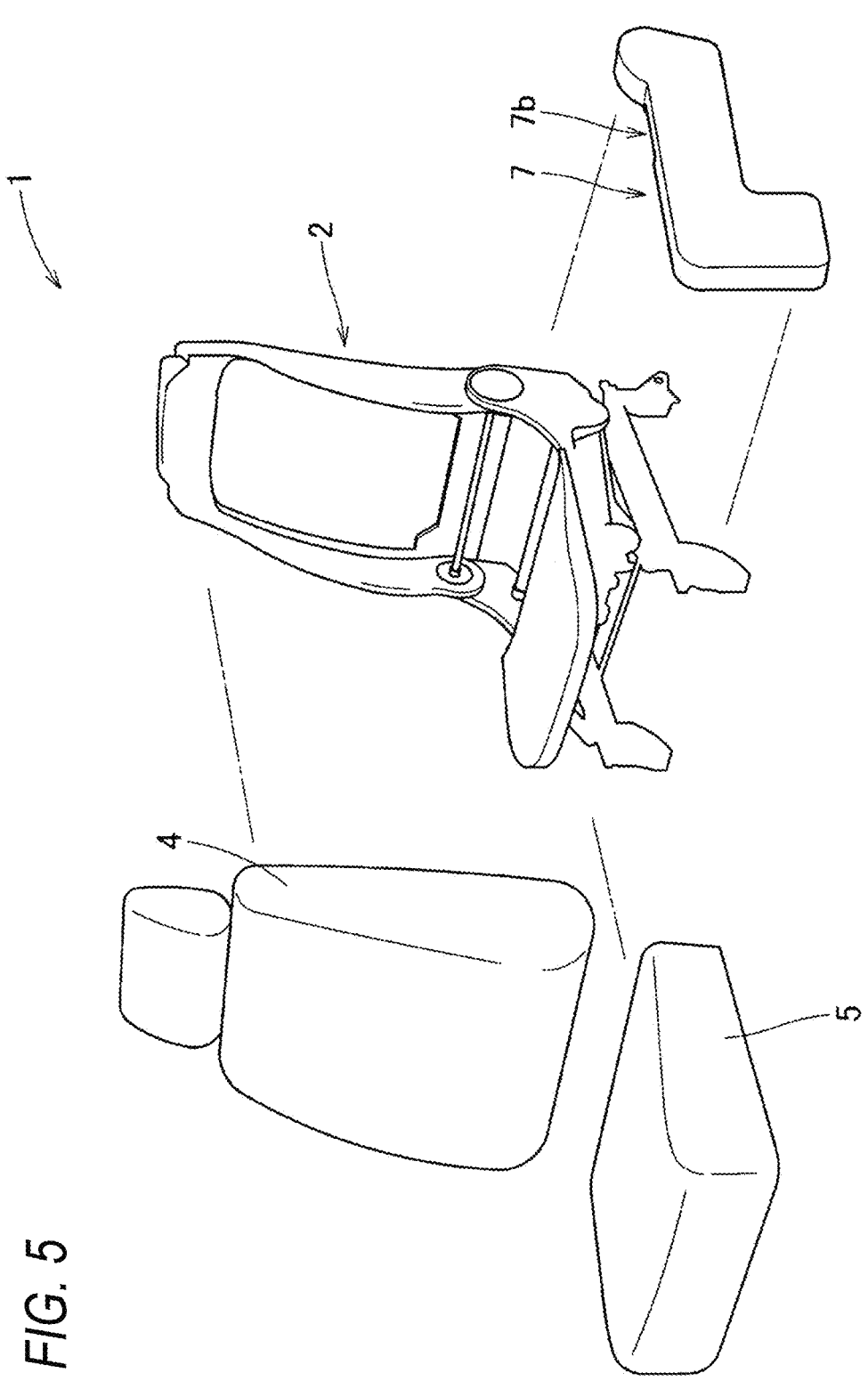
FIG. 5 is a schematic exploded perspective view illustrating a seat to be used in the passenger protection device according to the embodiment.

As illustrated in FIGS. 1, 2, and 5, the seat 1 includes a backrest part 4, a seat part 5, and a side cover 7 that covers a lateral side of the seat part 5. Each of the backrest part 4, the seat part 5, and the side cover 7 is supported by a seat frame 2. Specifically, the backrest part 4, the seat part 5, and the side cover 7 are appropriately attached to the seat frame 2 so as to cover an outer peripheral side of the seat frame 2. In the case of the embodiment, the vehicle on which the seat 1 is mounted is a right-hand drive vehicle although not illustrated in detail, and the seat 1 is a passenger seat. That is, the seat 1 is mounted on the vehicle with a right side as a center side in a vehicle width direction of the vehicle and a left side as an outer side in the vehicle width direction of the vehicle. In the seat 1 illustrated in FIGS. 1 and 2, the side cover 7 covers only the outer side (left side) of the seat part 5 in the vehicle width direction, but a side cover (not illustrated) is also disposed on an inner side (right side) of the seat part 5 in the vehicle width direction, although not illustrated.

The side cover 7 is made of a synthetic resin such as polypropylene (PP), covers the left side of the seat part 5 including a region on a lower end 2a side of the seat frame

Figure 3:
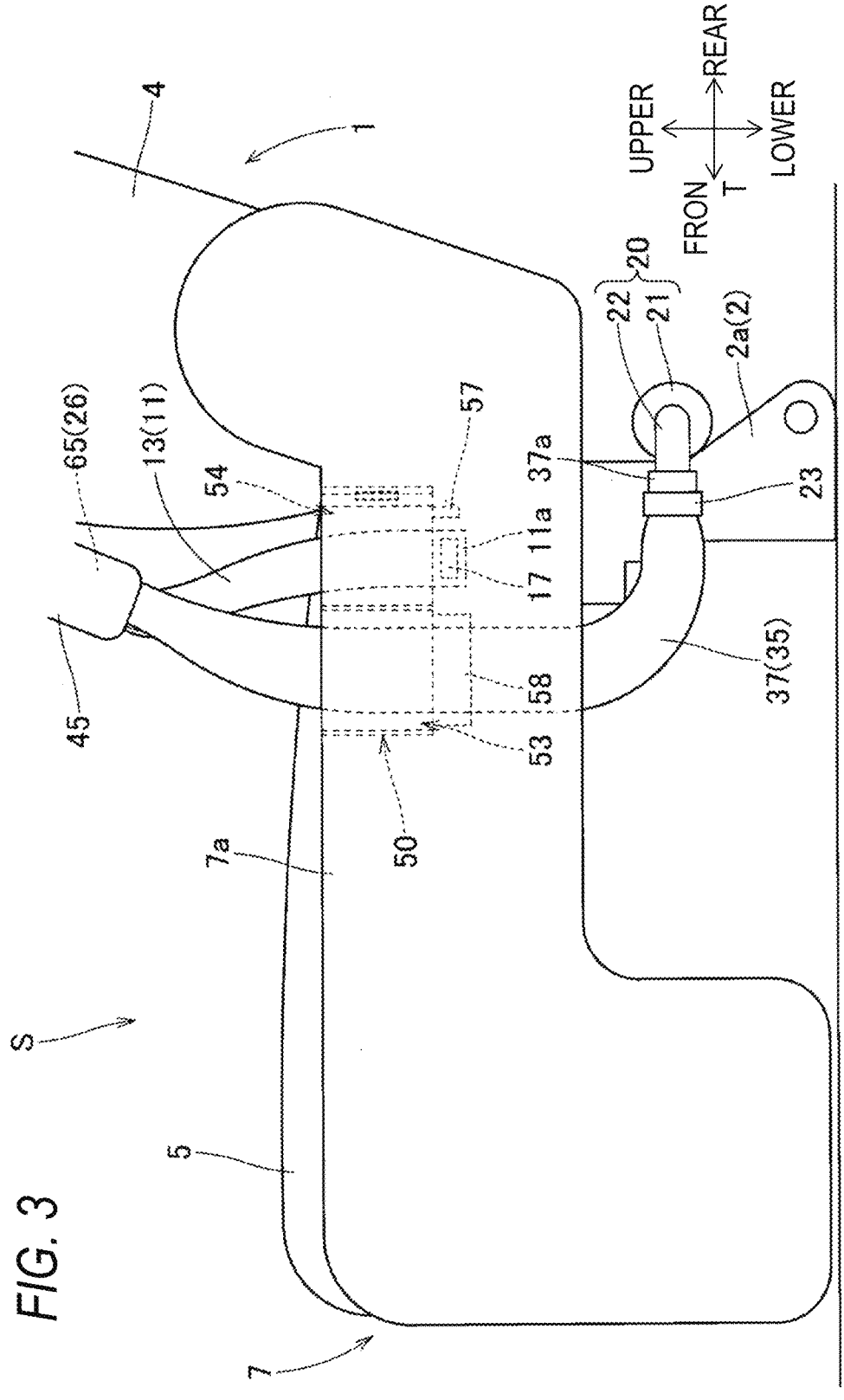
FIG. 3 is a partially enlarged side view illustrating the vicinity of an outer cover in the passenger protection device according to the embodiment.
Figure 4:
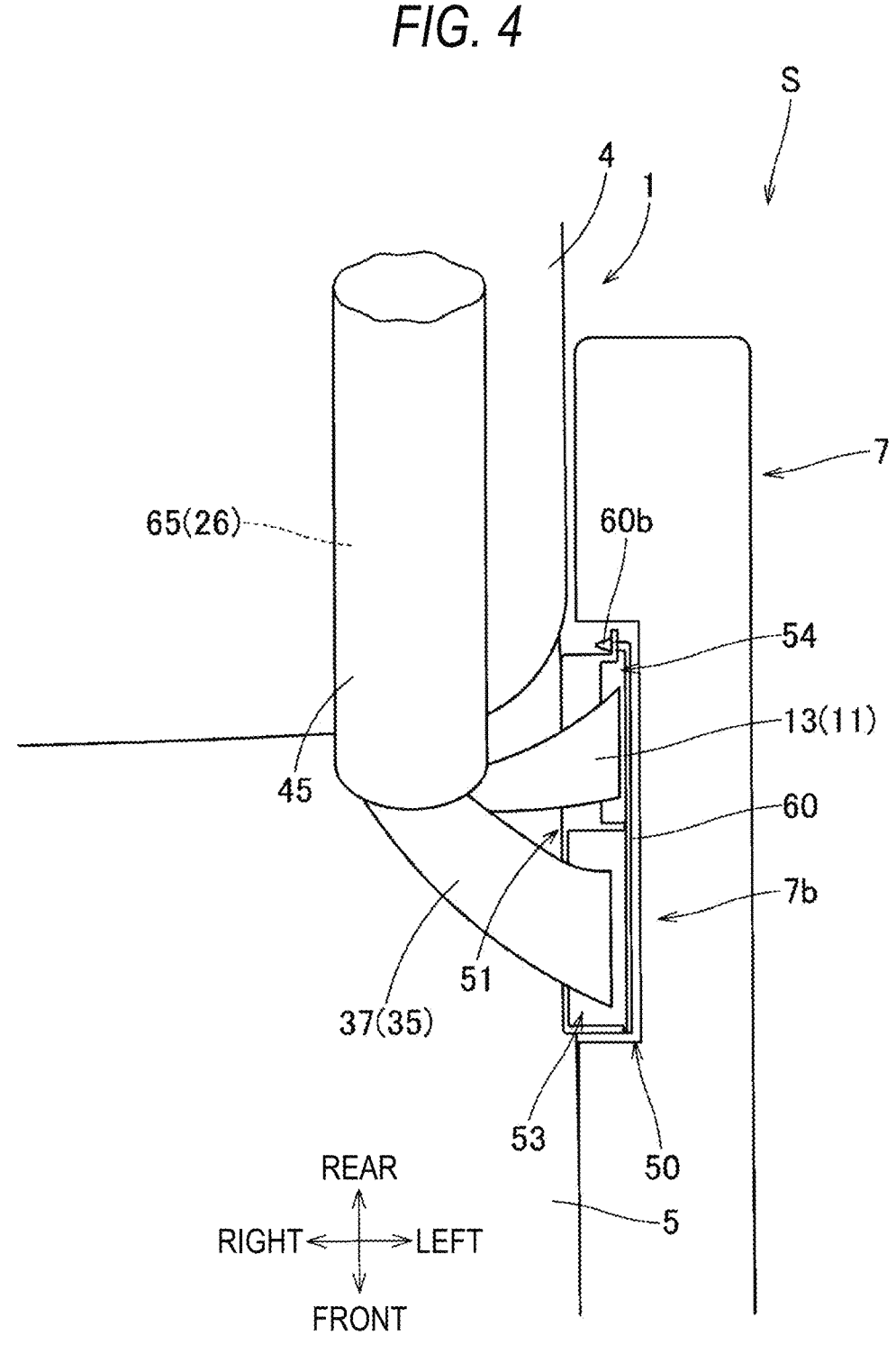
FIG. 4 is a partially enlarged plan view illustrating the vicinity of the outer cover in the passenger protection device according to the embodiment.

2 exposed to a lower side of the seat part 5, and covers a left side of a region on an end 11a side of the belt body 11 described later of the seat belt 10 (region in vicinity of anchor member 17) and a region of the conduit part 35 (specifically, connection side portion 37 of conduit part 35) of the airbag 25 (see FIGS. 1, 3, and 4). The side cover 7 is attached to the seat frame 2 by inserting and locking a plurality of locking protrusions (not illustrated) protruding rightward (toward seat frame 2) at predetermined positions into locking recesses (not illustrated) provided in the seat frame 2. A recess 7b for disposing the holder 50 is recessed leftward from a right edge side (see FIG. 4) in a region on an upper end 7a side of the side cover 7, specifically, an upper end side slightly behind a center in the front-rear direction.

In the case of the embodiment, the seat belt 10 is mounted on the seat 1, and includes the belt body 11 for restraining the passenger MP seated on the seat 1, a tongue plate 15 attached to the belt body 11, and a buckle 16 for coupling the tongue plate 15, as illustrated in FIG. 1. The buckle 16 is disposed on a right rear end side of the seat part 5 of the seat 1 (see FIG. 1). Regarding the belt body 11, one end thereof is locked to a winding shaft of a retractor (not illustrated) disposed in the backrest part 4, and the other end (end 11a) thereof is locked to the anchor member 17 (see FIGS. 1 and 3) disposed on a rear left end side of the seat part 5 of the seat 1, so that the belt body 11 can be fed out from the retractor at the time of wearing the seat belt. The belt body 11 is exposed to the outside from a left edge side of an upper end of the backrest part 4. In the case of the embodiment, in an unseated state of the passenger MP, the lap belt 13 on which the airbag 25 is disposed is exposed while being substantially along an upper-lower direction on a front surface of the backrest part 4, as illustrated in FIG. 1. The belt body 11 includes the lap belt 13 and a shoulder belt 12 accommodated in the backrest part 4, and in a state where the tongue plate 15 is fastened to the buckle 16 when the passenger is seated, restrains a lower half body MD (waist MW) of the passenger MP by the lap belt 13 disposed along the left-right direction between the anchor member 17 and the buckle 16, and restrains an upper half body MU (from shoulder to chest) of the passenger MP the shoulder belt 12 obliquely disposed over the buckle 16 while extending from the left edge side of the upper end of the backrest part 4 (see FIG. 2). In the embodiment, a portion of the belt body 11 (lap belt 13) in the vicinity of the end 11a (portion in vicinity of anchor member 17) is held by the holder 50. Specifically, the portion of the belt body 11 (lap belt 13) in the vicinity of the end 11a (portion in vicinity of anchor member 17) is held by the holder 50 in a state of being inserted into a lap belt insertion portion 54 formed in the holder 50 (see FIGS. 3, 4, and 10). In the seat belt 10, the retractor (not illustrated) disposed in the backrest part 4 has a pretensioner mechanism.

In the case of the embodiment, the inflator 20 is attached to the seat 1, and specifically, is disposed at a position in the vicinity of a lower end of the seat part 5 on a rear surface side of the seat 1. The inflator 20 includes a substantially columnar inflator body 21 (not illustrated in detail) disposed with an axial direction thereof substantially along the left-right direction, and a pipe part 22 extending from the inflator body 21 and supplying inflation gas to the airbag 25 (see FIG. 3). Although not illustrated in detail, the inflator body 21 is attached to a portion of the seat frame 2 on the lower end 2a side by using a predetermined bracket. The pipe part 22 extends from the inflator body 21 and is disposed such that a distal end thereof is located below the vicinity of the rear end of the seat part 5 on the left side of the seat 1, and the distal end is connected to the conduit part 35 described later in the airbag 25 by using a clamp 23 (see FIG. 3). In the case of the embodiment, the inflator body 21 is set such that start of an operation is delayed with respect to the pretensioner mechanism of the seat belt 10 in order to restrict the belt body 11 of the seat belt 10 from being pulled out due to the inflation of the airbag 25.

Figure 6:
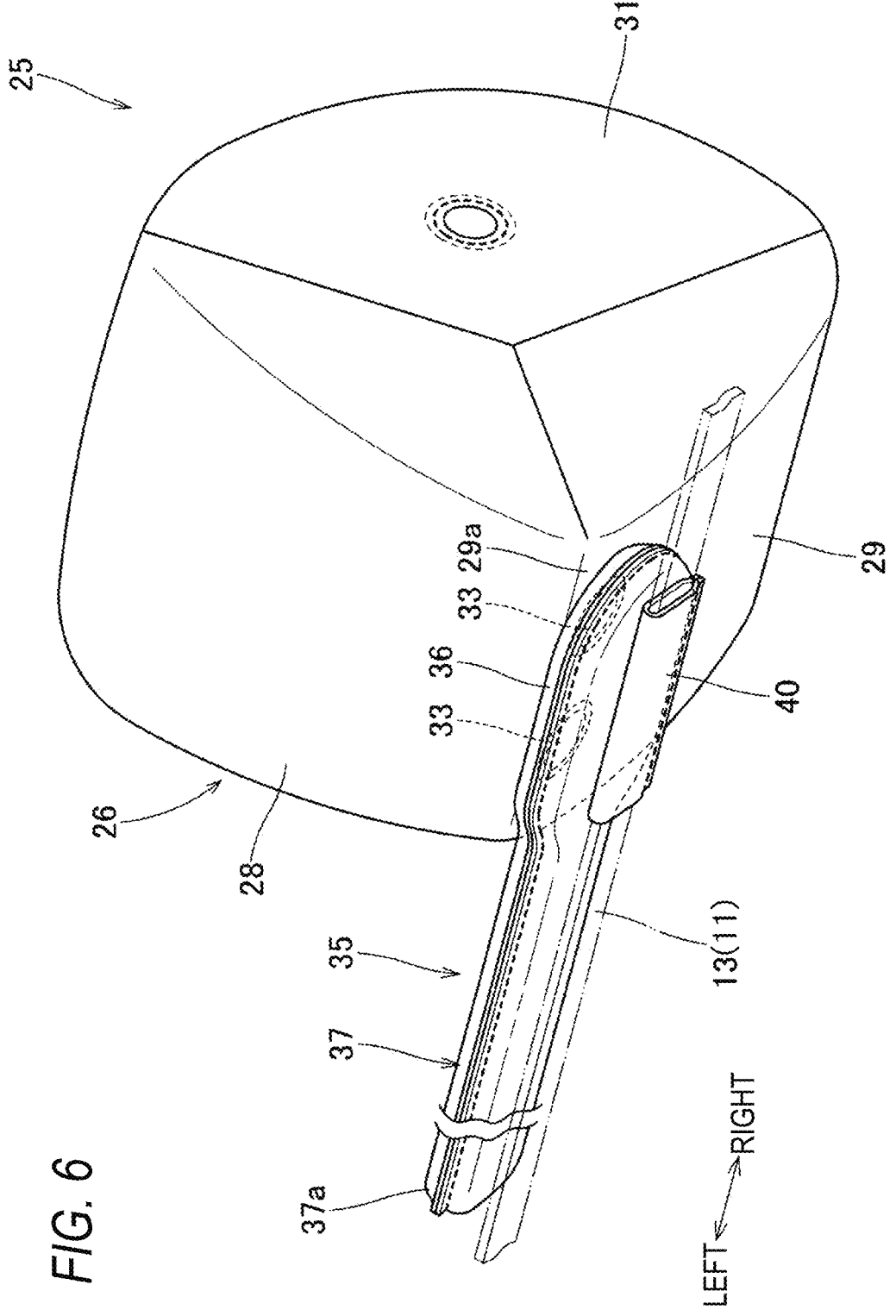
FIG. 6 is a schematic perspective view illustrating a state where an airbag to be used in the passenger protection device according to the embodiment is inflated alone.
Figure 7:
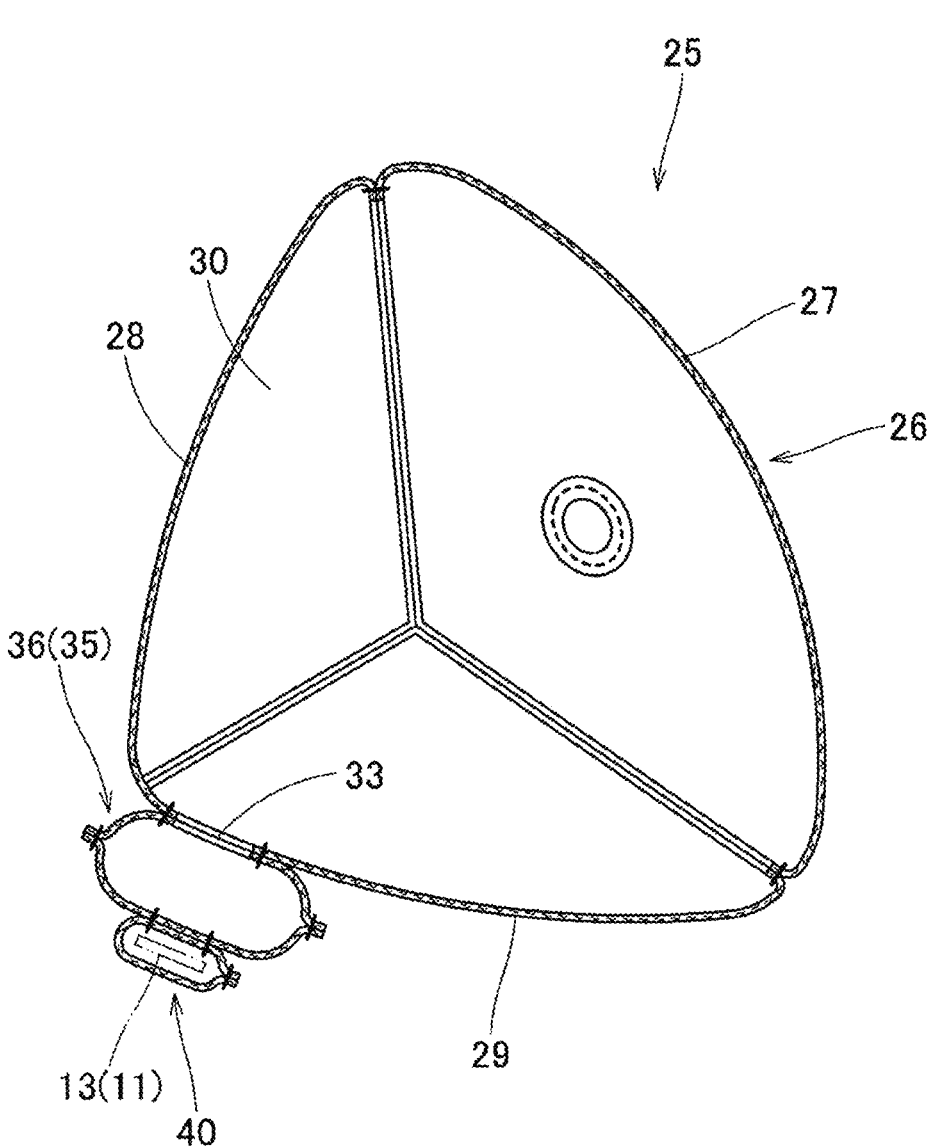
FIG. 7 is a schematic longitudinal sectional view of the airbag in FIG. 6.

The airbag 25 is disposed in a region of the lap belt 13 that restrains the lower half body MD (waist MW) of the passenger MP seated on the seat 1, and has a bag-shape formed of a flexible sheet body. As illustrated in FIGS. 6 and 7, the airbag 25 includes a bag body 26 that inflates to protect the passenger MP wearing the seat belt 10, the conduit part 35 that is connected to the inflator 20 and allows inflation gas to flow into the bag body 26, and a belt loop part 40 through which the lap belt 13 can be inserted. The airbag 25 (bag body 26, conduit part 35, and belt loop part 40) is formed of a flexible woven fabric made of polyester yarn, polyamide yarn, or the like.

Figure 12:
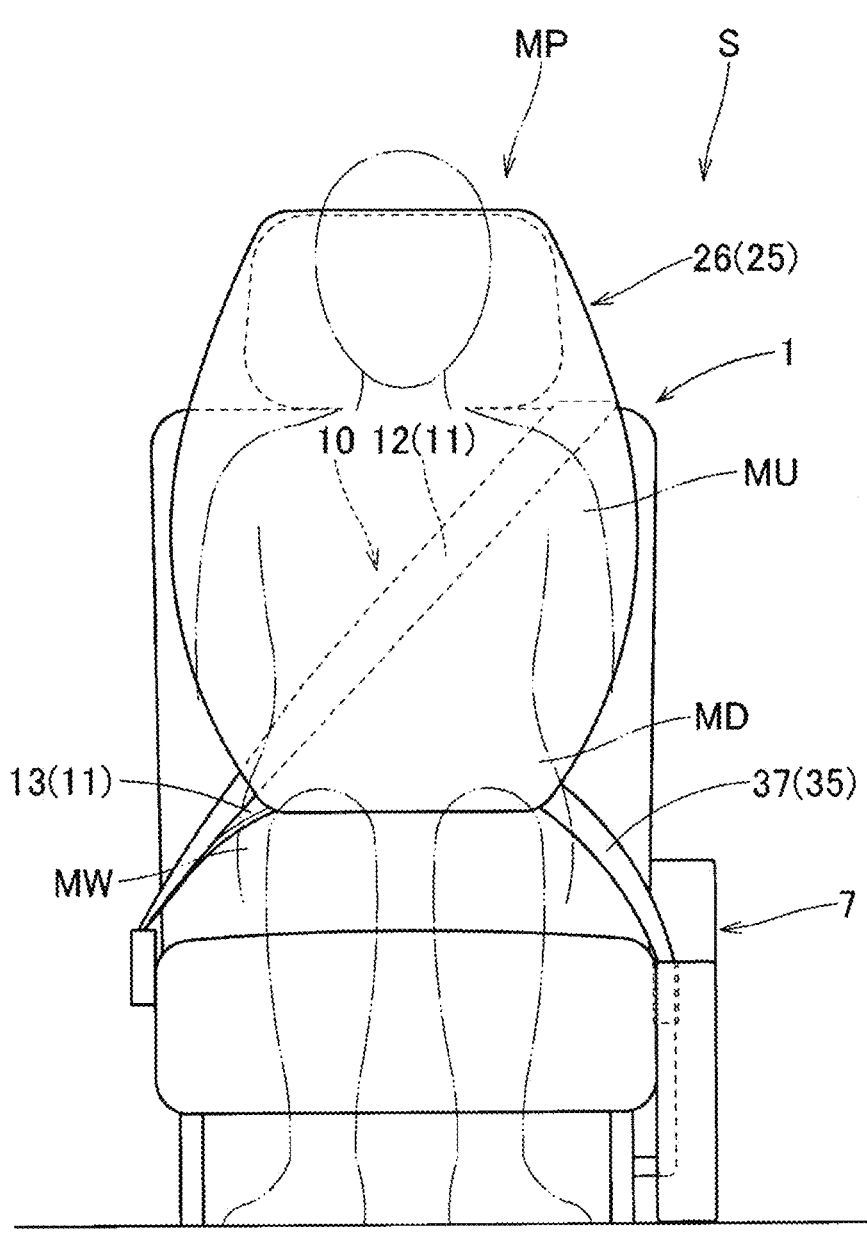
FIG. 12 is a front view of the passenger protection device according to the embodiment in a state where inflation of the airbag is completed.
Figure 13:
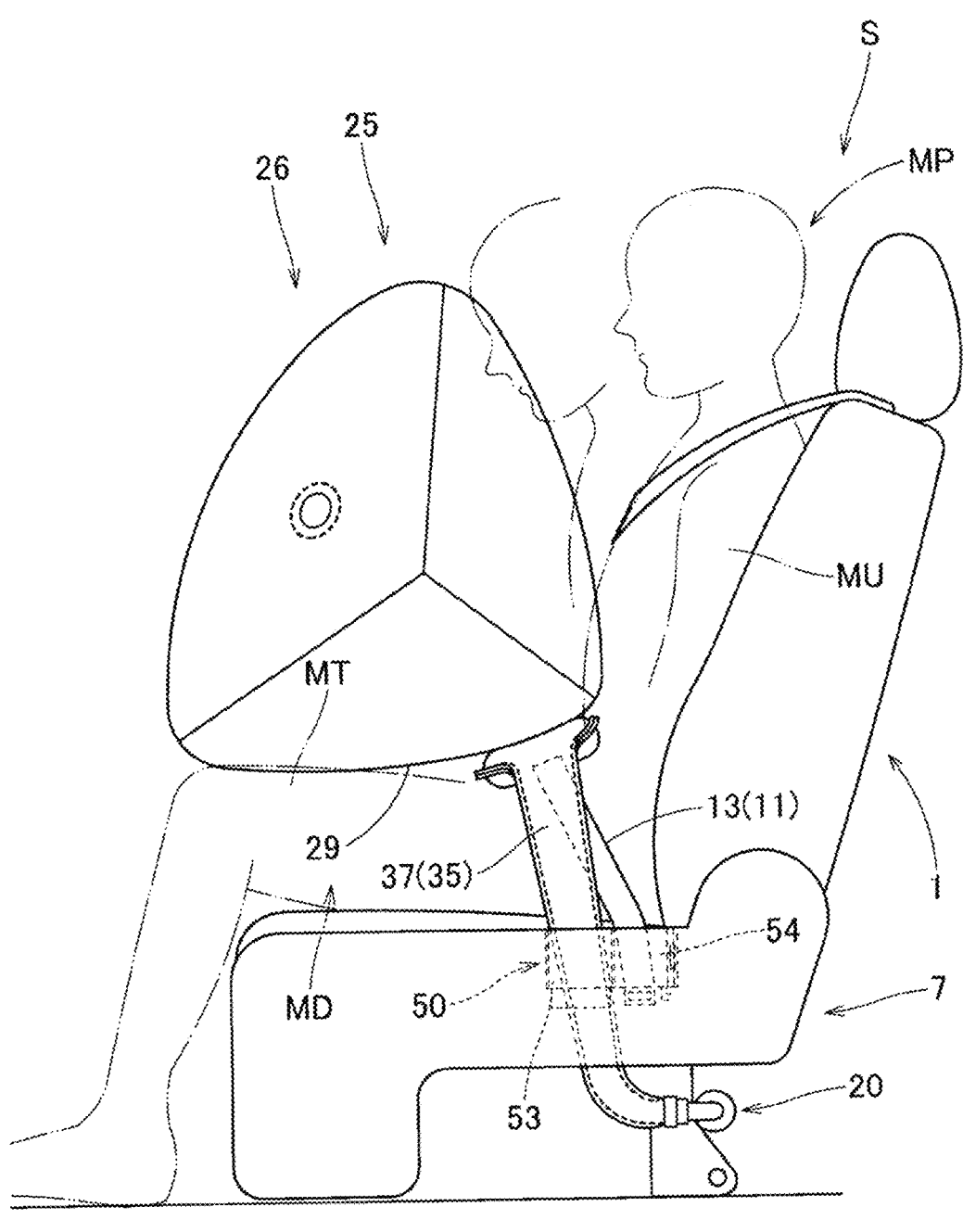
FIG. 13 is a side view of the passenger protection device according to the embodiment in the state where the inflation of the airbag is completed.

Regarding the bag body 26, an outer shape when the inflation is completed is a substantially triangular columnar shape of which an axial direction is substantially along the left-right direction an inflation completion shape in a state viewed from the left and right is a substantially right triangular shape having an oblique side on a front side, and an inflation completion shape in a state viewed from the front-rear direction is a substantially rectangular shape having a wide width in the upper-lower direction (see FIGS. 12 and 13). As illustrated in FIGS. 6 and 7, the bag body 26 includes a rear wall 28 disposed on a passenger MP side (rear side) when the inflation is completed, a front wall 27 facing the rear wall 28 in the front-rear direction, a lower wall 29 disposed on a lower end side when the inflation is completed, and a left wall 30 and a right wall 31 facing each other in the left-right direction when the inflation is completed. Regarding the bag body 26, the upper half body MU of the passenger MP is received by the rear wall 28 when the inflation is completed, and the passenger MP is received by the lower wall 29 abutting against a thigh MT of the passenger MP to be supported by the thigh MT when the upper half body MU is received by the rear wall 28 (see FIG. 13). In the bag body 26, the conduit part 35 is coupled to a lower surface side of a rear end 29a of the lower wall 29, and the inflation gas from the inflator 20 flows into the bag body 26 through the conduit part 35. In a region on a rear end 29a side of the lower wall 29, a communication hole 33 communicating with the conduit part 35 is opened in a circular shape, and in the case of the embodiment, two communication holes 33 are arranged in the left-right direction (see FIG. 6). The bag body 26 is coupled to the conduit part 35 at a peripheral portion of the communication hole 33.

The conduit part 35 extends leftward from a lower surface side of the bag body 26 and is connected to the inflator 20 (specifically, pipe part 22 of inflator 20), with a base portion side (right end side) as the bag body 26 side being closed and a distal end 37a side (left end side) being opened to be connectable to the pipe part 22. In the case of the embodiment, the conduit part 35 includes a body side portion 36 which is wide and is located on the lower surface side of the bag body 26 and a connection side portion 37 extending leftward from the bag body 26 when inflation is completed, as illustrated in FIG. 6. The connection side portion 37 is narrower than the body side portion 36. The conduit part 35 is held by the holder 50 at an intermediate portion of the connection side portion 37 in a longitudinal direction (region disposed to left of seat part 5). Specifically, the intermediate portion of the connection side portion 37 is held by the holder 50 in a state of being inserted into a conduit part insertion portion 53 formed in the holder 50 (see FIGS. 1, 3, and 4). When the inflation of the airbag 25 is completed, the conduit part 35 is disposed substantially along the left-right direction so as to be substantially along the lap belt 13 while the intermediate portion of the connection side portion 37 is held by the holder 50 (see FIGS. 12 and 13), and the distal end 37a side (left end side) of the connection side portion 37 is connected to the pipe part 22 of the inflator 20 by using the clamp 23 as described above (see FIG. 3).

As illustrated in FIGS. 6 and 7, the belt loop part 40 is disposed on a lower surface side of the body side portion 36 of the conduit part 35 (that is, region below bag body 26), and has a tubular shape disposed substantially along the left-right direction substantially along the lap belt 13 so that the lap belt 13 can be inserted therethrough. In the case of the embodiment, the belt body 11 in a state where the anchor member 17 is coupled to the end 11a side can be inserted into the belt loop part 40 together with the anchor member 17. The bag body 26 is held by the lap belt 13 by inserting the lap belt 13 into the belt loop part 40.

In the embodiment, the airbag 25 is held by the lap belt 13 so as to be capable of shifting and moving with respect to the lap belt 13 in a state of a folded body 65 formed by folding a region of the bag body 26 in an elongated shape. Specifically, although not illustrated in detail, the airbag 25 is folded such that the bag body 26 in a substantially flat developed state is folded so as to reduce a width dimension thereof in the front-rear direction, with the front wall 27 overlapping the rear wall 28 and the lower wall 29, thereby forming an elongated folded body 65 substantially along the left-right direction. The folded body 65 formed by folding the bag body 26 in this manner overlaps, together with the body side portion 36 of the conduit part 35, the upper surface side when the lap belt 13 is worn by inserting the lap belt 13 into the belt loop part 40. The folded body 65 is disposed in the region of the lap belt 13 in a state where the periphery of the folded body 65 including the belt loop part 40 and the lap belt 13 is covered with an airbag cover 45 (see FIG. 2). In the case of the embodiment, the folded body 65 is disposed on the back surface side (backrest part 4 side) of the lap belt 13 exposed on the front surface of the backrest part 4 in a non-worn state as illustrated in FIG. 1. In addition, in the case of the embodiment, the connection side portion 37 of the conduit part 35 is exposed to the upper surface side of the lap belt 13 on the left side of the folded body 65 in a worn state of the seat belt 10 (see FIG. 2).

The airbag cover 45 covering the periphery of the folded body 65 is formed of a flexible sheet body, specifically, a sheet body such as synthetic leather or fabric. As described above, the airbag cover 45 covers substantially the entire outer peripheral side of the folded body 65 and the body side portion 36 of the conduit part 35, including the belt loop part 40 and a part of the lap belt 13 (see FIGS. 1 and 2). The bag body 26 can protrude by breaking a predetermined portion of the airbag cover 45 over substantially entire left and right regions when the airbag 25 is inflated.

In the case of the embodiment, the holder 50 is capable of holding the conduit part 35 in the airbag 25 and the lap belt 13 (belt body 11) of the seat belt 10, and is disposed between the seat part 5 and the side cover 7 of the seat 1. Specifically, the holder 50 holds the connection side portion 37 of the conduit part 35 and a portion of the belt body 11 (lap belt 13) in the vicinity of the end 11a (portion in vicinity of anchor member 17) so as to cover the periphery of the holder 50 while allowing the connection side portion 37 and the portion in the vicinity of the end 11a to penetrate in the upper-lower direction, is housed in the recess 7b provided in the side cover 7 so as to expose the upper end side of the holder 50, and is surrounded by the side cover 7 and the seat part 5 (see FIGS. 1, 3, 4, and 11). The holder 50 is made of a soft synthetic resin such as polypropylene (PP). The holder 50 has a flat, substantially rectangular cylindrical outer shape, and includes a body part 51 disposed on a seat part 5 side (right side) and a lid part 60 disposed on a side facing the side cover 7 (left side) so as to cover the body part 51 (see FIGS. 8 to 11).

Figure 9:
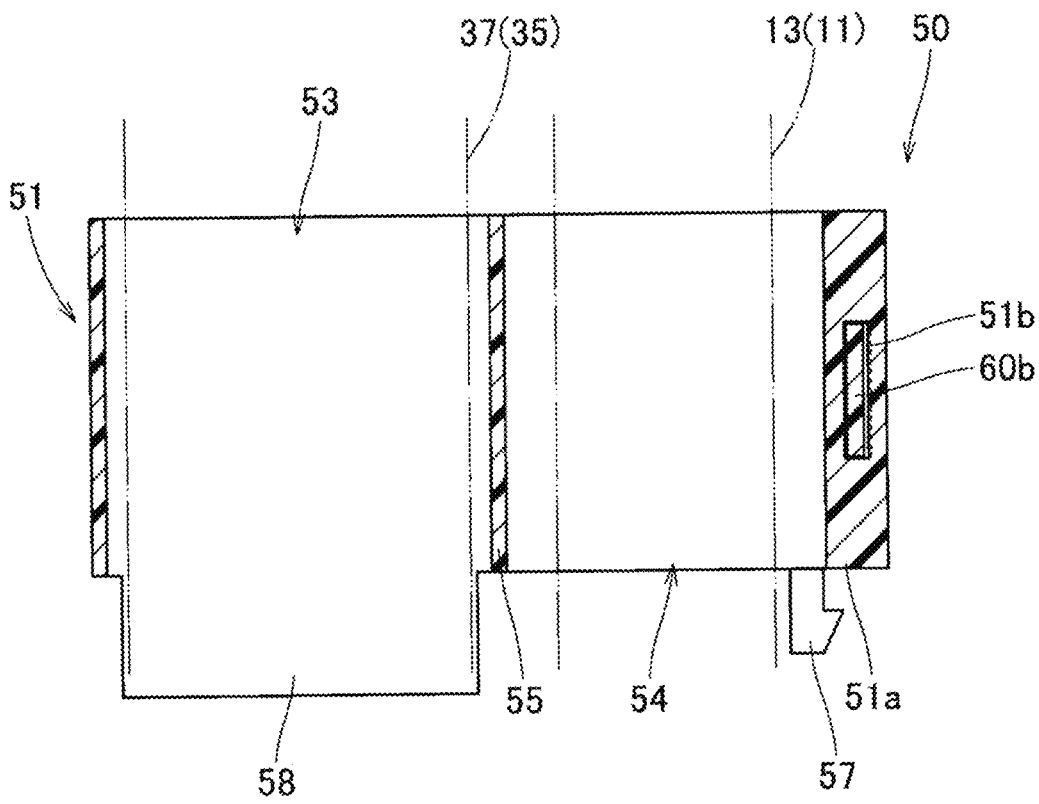
FIG. 9 is a schematic longitudinal sectional view of the holder in FIG. 8 taken along a front-rear direction.
Figure 10:
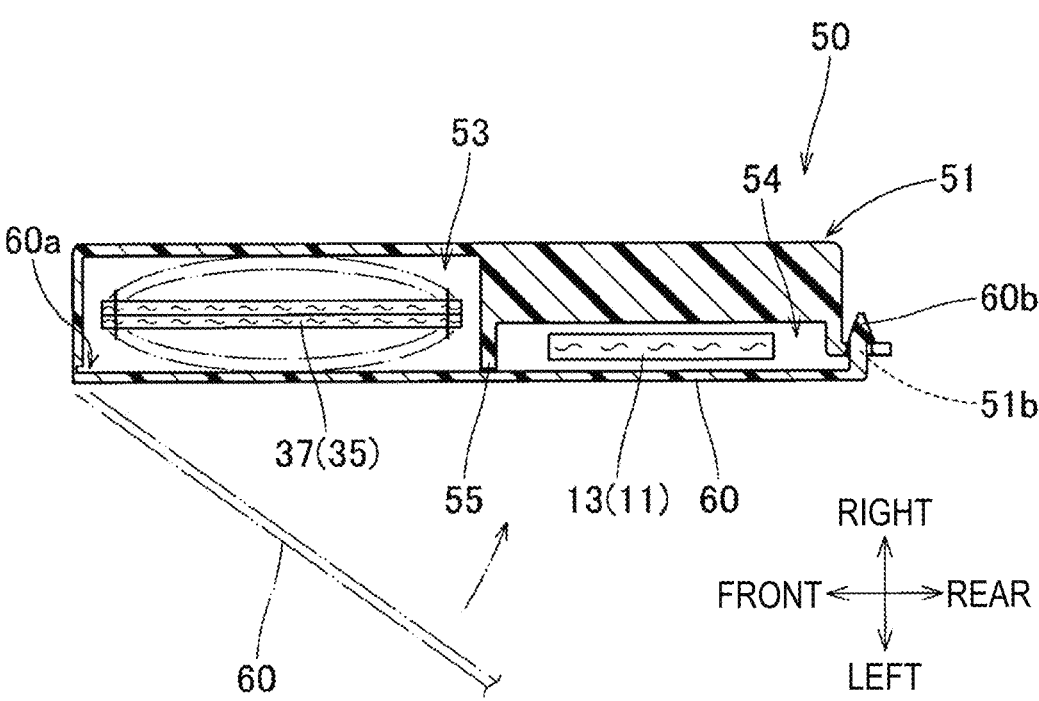
FIG. 10 is a schematic transverse sectional view of the holder in FIG. 8 along a left-right direction, and is a view in which a connection side portion of the conduit part and a lap belt are inserted.

In the body part 51, the conduit part insertion portion 53 into which the connection side portion 37 of the conduit part 35 can be inserted and the lap belt insertion portion 54 into which the lap belt 13 (portion in vicinity of end 11a of belt body 11) can be inserted are recessed from the left side (see FIG. 10). The conduit part insertion portion 53 and the lap belt insertion portion 54 are substantially uniformly recessed over the entire upper and lower regions of the body part 51 (so as to penetrate body part 51 in upper-lower direction) (see FIGS. 9 and 11). In the case of the embodiment, the conduit part insertion portion 53 and the lap belt insertion portion 54 are arranged in the front-rear direction, and more specifically, the conduit part insertion portion 53 is disposed on the front side. The width dimension of the conduit part insertion portion 53 in the front-rear direction is set to be larger than the width dimension of the connection side portion 37 in a flat developed state, and the width dimension of the lap belt insertion portion 54 in the front-rear direction is set to be larger than the width dimension of the belt body 11 (see FIGS. 9 and 10). In the case of the embodiment, the conduit part insertion portion 53 and the lap belt insertion portion 54 are partitioned in the front-rear direction by a partition wall 55. When the airbag 25 is deployed and inflated, the connection side portion 37 is inflated in the conduit part insertion portion 53 as indicated by a two-dot chain line in FIG. 10, but a sectional area of the conduit part insertion portion 53 is set to a size that allows the inflation gas discharged from the inflator 20 to smoothly flow out to the bag body 26 side through the connection side portion 37 without rapidly reducing a sectional area of the connection side portion 37.

Figure 8:
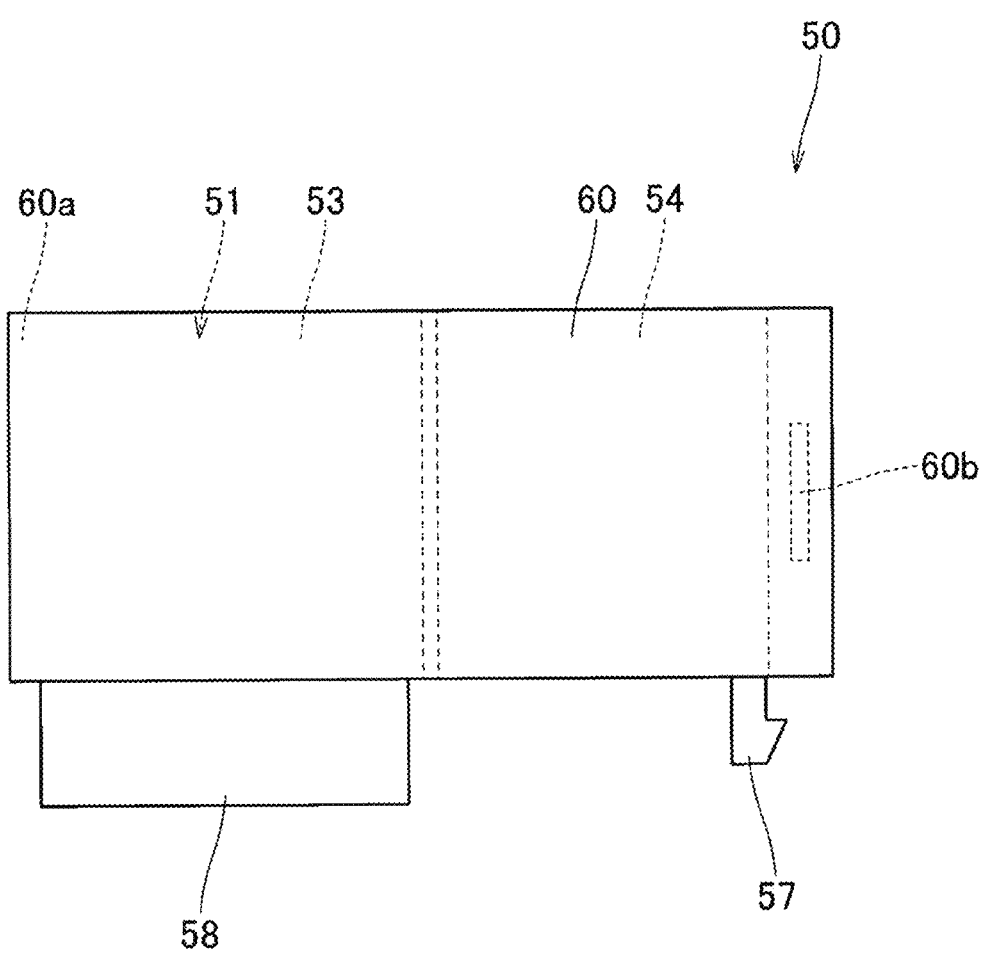
FIG. 8 is a front view of a holder to be used in the passenger protection device according to the embodiment (view seen from left side surface side when mounted on vehicle)
Figure 8:
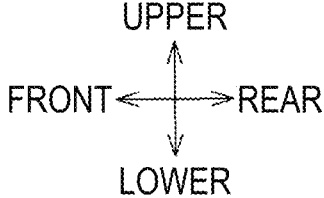
Figure 11:
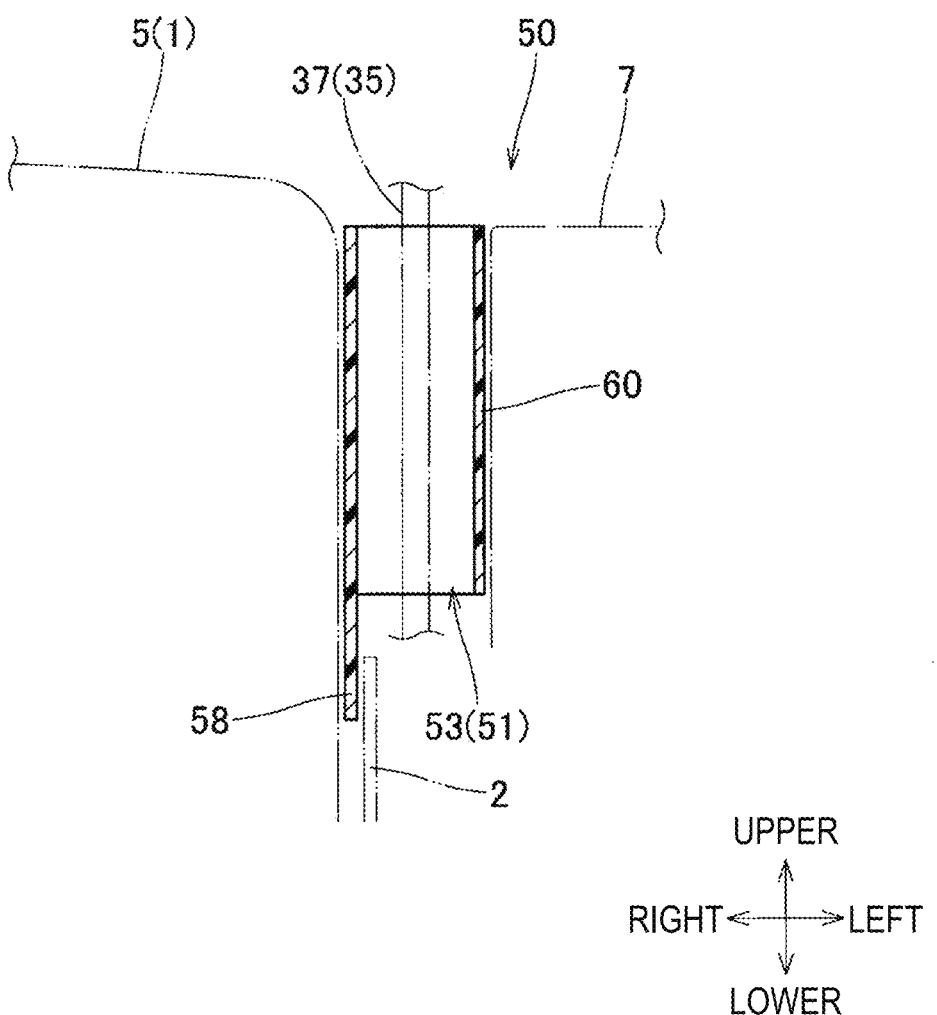
FIG. 11 is a schematic longitudinal sectional view along the left-right direction at a conduit part insertion portion in the holder in FIG. 8.

On a lower end 51a side of the body part 51, a protrusion 57 and an insertion piece 58 are arranged in the front-rear direction (see FIGS. 8 and 9). The protrusion 57 protrudes downward in the vicinity of a rear end of the body part 51, and can be inserted into an insertion hole formed on a lateral side of the seat part 5 although not illustrated in detail. The insertion piece 58 protrudes downward at a position in front of the protrusion 57 and on the right end side of the body part 51, has a plate shape substantially along the front-rear direction, and is insertable into a gap between the seat part 5 and the seat frame 2 as schematically illustrated in FIG. 11.

The lid part 60 covers the left side of the body part 51 over substantially the entire surface of the region excluding the protrusion 57 and the insertion piece 58, and is integrally formed with the body part 51 with a front end side thereof being coupled to a front end side of the body part 51 via a hinge 60a formed in a thin wall shape (see FIGS. 8 and 10). On a rear end side of the lid part 60, a locking protrusion 60b to be inserted and locked in a locking hole 51b provided in a rear end side of the body part 51 protrudes leftward (see FIGS. 9 and 10). The locking protrusion 60b extends along the upper-lower direction in the vicinity of the vertical center on the rear end side of the lid part 60.

The holder 50 is attached to the seat frame 2 of the seat 1 in a state before attachment of the side cover 7 in a state where the connection side portion 37 of the conduit part 35 and the lap belt 13 (belt body 11) are held. Specifically, although not illustrated in detail, the insertion piece 58 is inserted into the gap between the seat part 5 and the seat frame 2 at the same time as the protrusion 57 is inserted into the insertion hole (not illustrated) provided on a lateral side of the seat part 5, so that the holder 50 is attached to the seat frame 2 in a state where movement in the front-rear and left-right directions is restricted. By attaching the holder 50 to the seat frame 2 side, it is possible to fix the positions of the connection side portion 37 of the conduit part 35 and the lap belt 13 (belt body 11) with respect to the seat frame 2 and the seat part 5.

Next, mounting of the passenger protection device S according to the embodiment on a vehicle will be described. The seat 1 is fixed in advance to a vehicle body side of a vehicle (not illustrated) in a state where the side cover 7 is not attached (state where seat part 5 and backrest part 4 are attached to seat frame 2). First, the bag body 26 is folded to form the folded body 65, and a wrapping material (not illustrated) for preventing collapse is wound around outer peripheral sides of the folded body 65 and the body side portion 36 of the conduit part 35. Next, the distal end 37a of the connection side portion 37 of the conduit part 35 extending from the folded body 65 is coupled to the inflator 20 by using the clamp 23 to form an airbag assembly. Thereafter, first, the inflator 20 is attached to the lower end 2a side of the seat frame 2 by using a predetermined bracket (not illustrated). The belt body 11 of the seat belt 10, which extends from the retractor (not illustrated), is inserted into the belt loop part 40 disposed on the lower surface side of the folded body 65 together with the anchor member 17. The airbag cover 45 covers the periphery of the folded body 65. Thereafter, the end 11a of the belt body 11 is fixed to a rear left side of the seat part 5 of the seat 1 by using the anchor member 17. Next, the holder 50 is disposed around the connection side portion 37 and the belt body 11 (lap belt 13) so that the connection side portion 37 of the conduit part 35 in the airbag 25 and the belt body 11 (lap belt 13) are inserted into the conduit part insertion portion 53 and the lap belt insertion portion 54, respectively. The holder 50 is attached to the seat frame 2 side by using the protrusion 57 and the insertion piece 58. Thereafter, when the side cover 7 is attached to the seat frame 2 so as to cover the left side of the seat part 5, the passenger protection device S can be mounted on the vehicle.

In the passenger protection device S according to the embodiment, when the inflator 20 is operated in a state where the passenger MP is seated on the seat 1 mounted on the vehicle while the seat belt 10 is worn, inflation gas discharged from the inflator 20 flows into the bag body 26 through the conduit part 35, and inflation is completed as illustrated by a two-dot chain line in FIG. 2 and FIGS. 12 and 13 while the bag body 26 of the airbag 25 protrudes forward and upward from the lap belt 13 so as to break the airbag cover 45.

In the passenger protection device S according to the embodiment, the seat 1 includes the side cover 7 that covers the lateral side of the seat part 5, and the bag body 26 of the airbag 25 is coupled, via the conduit part 35, to the inflator 20 disposed in the vicinity of the lower end of the seat part 5, but the conduit part 35 is disposed between the seat part 5 and the side cover 7 in a state of being held by the holder 50 attached to the seat frame 2 side. That is, in the passenger protection device S according to the embodiment, a position of the conduit part 35 with respect to the seat 1 (seat part 5 or the like) can be restricted by attaching the holder 50 holding the conduit part 35 to the seat frame 2 side, even when the elongated conduit part 35 formed of a flexible sheet body which is the same material as the bag body 26 passes between the seat part 5 and the side cover 7. Therefore, when the side cover 7 is attached to the seat frame 2 in a state where the airbag 25 is held by the lap belt 13, the conduit part 35 can be disposed at an appropriate position, and it is possible to suppress engagement between the side cover 7 and the seat frame 2.

Therefore, the airbag 25 can be easily mounted on the seat 1 of a type including the side cover 7 in the passenger protection device S according to the embodiment.

In the passenger protection device S according to the embodiment, the holder 50 is configured to be capable of holding the lap belt 13 (belt body 11) together with the conduit part 35 (connection side portion 37). Therefore, the position of the lap belt 13 with respect to the seat 1 (seat part 5 or the like) can also be restricted, and the attachment of the side cover 7 to the seat frame 2 is further facilitated. Of course, when such a point is not taken into consideration, the holder may hold only the conduit part without holding the lap belt.

Further, in the passenger protection device S according to the embodiment, the holder 50 includes the conduit part insertion portion 53 in which the conduit part 35 is inserted to be held, and the lap belt insertion portion 54 in which the lap belt 13 is inserted to be held. The conduit part insertion portion 53 and the lap belt insertion portion 54 are arranged in the front-rear direction. Therefore, the holder can be prevented from being bulky even when the conduit part 35 and the lap belt 13 are held. When such a point is not taken into consideration, a holder having a configuration in which a conduit part insertion portion and a lap belt insertion portion overlap each other in the left-right direction may be used. In the embodiment, the conduit part insertion portion 53 and the lap belt insertion portion 54 are partitioned by the partition wall 55, but the conduit part insertion portion and the lap belt insertion portion may not be partitioned in the front-rear direction without such a partition wall.

Furthermore, in the passenger protection device S according to the embodiment, the holder 50 includes the lid part 60 that covers the side facing the side cover 7. Therefore, the side cover 7 side of the conduit part 35 and the lap belt 13 can be covered with the lid part 60. In other words, the outer peripheral side of the conduit part 35 and the lap belt 13 can be covered with the holder 50 over an entire circumference in an axial direction. As a result, protrusion of the conduit part 35 and the lap belt 13 from the holder 50 can be appropriately suppressed, and attachment workability at the time of attaching the side cover 7 to the seat frame 2 is further improved. In the holder 50 according to the embodiment, the lid part 60 and the body part 51 are integrally formed via the hinge 60*a* which is thin, and thus it is possible to reduce the manufacturing cost and the number of assembling steps. The shape of the holder is not limited to the embodiment, and for example, a holder may be used in which a lid part is formed separately from a body part and is attached to the body part using a separate attachment means. Further, when the above points are not taken into consideration, a holder having a configuration in which a conduit part and a lap belt can be held by a body part itself and a lid part is not provided can be used.

In the passenger protection device S according to the embodiment, the seat belt 10 and the inflator 20 are mounted on the seat 1. Therefore, even when the seat 1 is used in a state of being moved relative to the vehicle by being largely slid or rotated in the front-rear direction, the passenger MP seated on the seat 1 can be appropriately protected by the airbag 25. Of course, the passenger protection device according to the present disclosure is not limited to a seat having such a configuration, and may be mounted on a seat of a type that restrains a passenger by a seat belt with a retractor being provided on a vehicle body side. An inflator may also be attached to the body side of the vehicle.

What is claimed is:

1. A passenger protection device configured to protect a passenger, the passenger protection device comprising:
   a seat including a backrest part, a seat part, and a side cover covering a lateral side of the seat part;
   a seat belt configured to restrain the passenger seated on the seat;
   an airbag disposed on the seat belt in a region of a lap belt configured to restrain a waist of the passenger seated on the seat in a state where the seat belt is worn; and
   an inflator disposed in a vicinity of a lower end of the seat part, and configured to supply inflation gas to the airbag, wherein
   the airbag is configured to include:
      a bag body being in a bag-shape formed of a flexible sheet body, and inflated to protect the passenger in the state where the seat belt is worn; and
      a conduit part connected to the inflator, and configured to allow the inflation gas to flow into the bag body,
   the conduit part is disposed between the seat part and the side cover in a state of being held by a holder attached to a seat frame side of the seat,
   the holder is configured to hold the lap belt together with the conduit part,
   the holder includes:
      a conduit part insertion portion in which the conduit part is inserted to be held; and
      a lap belt insertion portion in which the lap belt is inserted to be held, and
   the conduit part insertion portion and the lap belt insertion portion are arranged in a front-rear direction.

2. A passenger protection device configured to protect a passenger, the passenger protection device comprising:
   a seat including a backrest part, a seat part, and a side cover covering a lateral side of the seat part;
   a seat belt configured to restrain the passenger seated on the seat;
   an airbag disposed on the seat belt in a region of a lap belt configured to restrain a waist of the passenger seated on the seat in a state where the seat belt is worn; and
   an inflator disposed in a vicinity of a lower end of the seat part, and configured to supply inflation gas to the airbag, wherein
   the airbag is configured to include:
      a bag body being in a bag-shape formed of a flexible sheet body, and inflated to protect the passenger in the state where the seat belt is worn; and
      a conduit part connected to the inflator, and configured to allow the inflation gas to flow into the bag body,
   the conduit part is disposed between the seat part and the side cover in a state of being held by a holder attached to a seat frame side of the seat, and
   the holder includes a lid part which covers a side facing the side cover.

* * * * *